United States Patent [19]

Lange

[11] 4,316,964

[45] Feb. 23, 1982

[54] AL$_2$O$_3$/ZRO$_2$ CERAMIC

[75] Inventor: Frederick F. Lange, Thousand Oaks, Calif.

[73] Assignee: Rockwell International Corporation, El Segundo, Calif.

[21] Appl. No.: 167,902

[22] Filed: Jul. 14, 1980

[51] Int. Cl.$^3$ .............................................. C04B 35/48
[52] U.S. Cl. .................................................... 501/105
[58] Field of Search ......................... 106/57, 73.2, 73.4

[56] References Cited

U.S. PATENT DOCUMENTS

| | | | |
|---|---|---|---|
| 3,761,295 | 9/1973 | Hulse et al. ........................... | 106/57 |
| 4,155,124 | 5/1979 | Kawahara et al. .................... | 106/57 |
| 4,218,253 | 8/1980 | Dworak et al. ..................... | 106/73.4 |
| 4,221,650 | 9/1980 | Friese et al. ......................... | 106/57 |

*Primary Examiner*—James Poer
*Attorney, Agent, or Firm*—H. Fredrick Hamann; Craig O. Malin

[57] ABSTRACT

Fracture toughness and strength of an Al$_2$O$_3$/ZrO$_2$ ceramic is increased by incorporating metastable grains of tetragonal ZrO$_2$ in the structure. During cracking, the metastable tetragonal ZrO$_2$ transforms to a stable monoclinic structure thus increasing the energy required for the crack to propagate and retarding its growth. The ZrO$_2$ occupies from 5 to 95% of the volume of the ceramic and has dissolved in it a rare earth oxide such as Y$_2$O$_3$, CeO$_2$, La$_2$O$_3$ and/or Er$_2$O$_3$ to promote retention of the metastable tetragonal ZrO$_2$.

9 Claims, No Drawings

$Al_2O_3/ZrO_2$ CERAMIC

STATEMENT OF GOVERNMENT INTEREST

The invention described herein was made under a contract with the Office of Naval Research.

BACKGROUND OF THE INVENTION

1. Field of the Invention

This invention relates to the field of ceramics and particularly to $ZrO_2$ ceramics.

2. Description of the Prior Art

During cooling, $ZrO_2$ undergoes a martensitic-type transformation from a tetragonal crystal structure to a monoclinic crystal structure with a concurrent increase in volume and an anisotropic shape change. For pure $ZrO_2$ the transformation begins at about 1200° C. and proceeds until complete at about 600° C.

Attempts have been made to utilize this transformation in order to improve the fracture toughness of ceramic composites. In one approach, $ZrO_2$ particles have been added to an $Al_2O_3$ matrix to form a second phase dispersion (N. Claussen, J. Am. Ceram. Soc. 59, pg. 49, 1976). Expansion and shape change of the $ZrO_2$ as it transformed from the high temperature tetragonal structure to the room temperature monoclinic structure created microcracks. The resulting increase in fracture toughness was attributed to energy absorption by these microcracks.

More recently, attempts have been made to increase the toughness of $ZrO_2$ ceramics by taking advantage of metastable grains of tetragonal $ZrO_2$ within a surrounding matrix. These are grains of $ZrO_2$ which are tetragonal rather than monoclinic despite the fact that their temperature is below the unconstrained equilibrium transformation temperature range.

The metastable condition can be obtained by surrounding fine grains of $ZrO_2$ in a constraining matrix such as $Al_2O_3$. The matrix constrains the volume and shape change associated with the transformation of the grains of $ZrO_2$ and holds the $ZrO_2$ in its tegragonal state.

The tetragonal grains of $ZrO_2$ increase the fracture toughness of the ceramic composite by increasing the energy required for a crack to propogate. If a crack starts in the ceramic composite, the metastable grains of tetragonal $ZrO_2$ in the stress field adjacent the crack transform to the stable monoclinic structure. The work done by the applied stresses to reduce this transformation is loss and thus the stress-induced transformation increases the material's fracture toughness.

Metastable tetragonal grains of $ZrO_2$ have been observed in an $Al_2O_3/ZrO_2$ ceramic composite containing 17 volume % $ZrO_2$ (N. Claussen, J. Am. Ceram. Soc. 59, pg. 85, 1978). However, to maintain the metastable tetragonal structure, the $ZrO_2$ grains had to be less than about 0.5 $\mu m$ in diameter. Larger grains transformed to the stable monoclinic structure. Additional work has shown that the amount of metastable tetragonal $ZrO_2$ that can be retained in the matrix decreases as the volume % of $ZrO_2$ in the $Al_2O_3/ZrO_2$ ceramic composite increases. Very little of the $ZrO_2$ can be retained in the metastable tetragonal structure in $Al_2O_3/ZrO_2$ composites having more than 20 volume % $ZrO_2$. Such limitations of grain size and volume % of $ZrO_2$ reduces the practicality and the toughness of prior art $Al_2O_3/ZrO_2$ ceramic composites.

SUMMARY OF THE INVENTION

It is an object of the invention to provide an improved $Al_2O_3/ZrO_2$ ceramic.

It is an object of the invention to provide an $Al_2O_3/ZrO_2$ ceramic having increased fracture toughness.

It is an object of the invention to provide an $Al_2O_3/ZrO_2$ ceramic having increased strength.

It is an object of the invention to provide an $Al_2O_3/ZrO_2$ ceramic having a high volume % of metastable tetragonal $ZrO_2$.

It is an object of the invention to provide an $Al_2O_3/ZrO_2$ ceramic having metastable tetragonal $ZrO_2$ grains up to about 2 $\mu m$ in diameter.

According to the invention, a two phase ceramic composite is provided. One of the phases is $ZrO_2$ with a rare earth oxide such as $Y_2O_3$, $CeO_2$, $La_2O_3$, and/or $Er_2O_3$ dissolved therein to maintain at least some of the phase in the tetragonal structure. This phase can occupy from 5 to 95% of the volume of the composite, depending upon the specific properties desired. The other phase is $Al_2O_3$ and it occupies essentially the balance of the volume of the composite (95 to 5 volume %).

A sufficient amount of rare earth oxide is included in the composite to increase the amount of $ZrO_2$ in its metastable tetragonal structure at the expense of the stable monoclinic structure. However, the amount of rare earth oxide must be held below the quantity that produces the cubic structure of $ZrO_2$.

In a preferred embodiment the rare earth oxide is $Y_2O_3$ in the range of 0.5 to 5.5 mole % of $$Y_2O_3 \text{ to } Y_2O_3 \text{ plus } ZrO_2 \left( \frac{\text{moles of } Y_2O_3 \times 100}{\text{moles of } Y_2O_3 + \text{moles of } ZrO_2} \right).$$

In a second preferred embodiment the rare earth oxide is $CeO_2$ in the range of 0.5 to 10 mole % of $CeO_2$ to $CeO_2$ plus $ZrO_2$.

In a third preferred embodiment the rare earth oxide is $Er_2O_3$ in the range of 0.5 to 4 mole % of $Er_2O_3$ to $Er_2O_3$ plus $ZrO_2$.

In a fourth preferred embodiment the rare earth oxide is $La_2O_3$ in the range of 0.5 to 5.0 mole % of $La_2O_3$ to $La_2O_3$ plus $ZrO_2$.

The fracture toughness and strength of the $Al_2O_3/ZrO_2$ ceramic is attributed to the metastable grains of tetragonal $ZrO_2$ in the structure. During cracking, the metastable tetragonal $ZrO_2$ transforms to a stable monoclinic structure in the vicinity of the crack thus increasing the energy required for the crack to propagate.

DESCRIPTION OF THE PREFERRED EMBODIMENTS

Stress-induced, martensitic transformation can be used to increase the fracture toughness of brittle materials containing $ZrO_2$. Metastable, tetragonal $ZrO_2$ in the toughening agent. Transformation to its stable, monoclinic structure in the vicinity of the crack front is believed to be responsible for the increased fracture toughness.

To take advantage of this phenomena, it is necessary to fabricate materials containing $ZrO_2$ in the metastable tetragonal structure rather than in the monoclinic structure normally obtained during cooling after sintering or annealing.

Retention of the metastable tetragonal structure is promoted by the strain energy arising from elastic constraint imposed by the surrounding material on the transformation shape change. This constraint can arise from two sources. First, if the polycrystalline body is single phase, neighboring grains, each with a different crystallographic orientation, will constrain the anisotropic shape change of one another. Second, for two phase materials, any matrix surrounding the particle will constrain the particle's shape change.

To determine the amount of metastable tetragonal $ZrO_2$ which could be retained in an $Al_2O_3/ZrO_2$ ceramic, samples having different volume % (v/o) of $ZrO_2$ were prepared. Sub-micron powders were used; the $Al_2O_3$ being from Union Carbide Corporation (Linde B powder) and the $ZrO_2$ being from Zircar Corporation. Composite powders were mixed by ball-milling with methanol and $Al_2O_3$ balls in a plastic container, and then dried. Densification was achieved by hot-pressing the powders for 2 hours at a temperature selected to obtain small grain size and therefore favor the retention of tetragonal $ZrO_2$.

Specimens were cut, ground, and polished prior to phase identification by X-ray diffraction analysis. Polishing was used to reduce surface damage from cutting and grinding which causes the surface to transform.

Two-theta scans between 27° to 33° were used to estimate the tetragonal/monoclinic $ZrO_2$ ratio, and scans between 55° to 62° were used to confirm the tetragonal or the cubic $ZrO_2$ structure.

Table I shows the amount of tetragonal $ZrO_2$ which was retained in the structure. High proportions of tetragonal $ZrO_2$ could be retained only for less than about 10 v/o $ZrO_2$. The 20 v/o $ZrO_2$ composition was friable, indicative of its high monoclinic content and suggestive of a highly microcracked material.

TABLE I

Phase Content and Properties of $Al_2O_3/ZrO_2$ Composites

| $ZrO_2$ v/o | Pressing Temp, °C. | Tetragonal $ZrO_2$ Phase % | Density gm/cm$^3$ | Vickers Hardness G Pa | Stress Intensity Factor, $K_c$ MPam$^{\frac{1}{2}}$ |
|---|---|---|---|---|---|
| 0 | 1400 | | 3.98 | 17.6 | 4.89 |
| 7.5 | 1500 | ~90 | 4.12 | 17.2 | 5.88 |
| 10.0 | 1500 | ~80 | 4.15 | 15.8 | 6.73 |
| 12.5 | 1500 | ~70 | 4.22 | 16.9 | 6.21 |
| 15.0 | 1500 | ~50 | 4.25 | 17.3 | 5.71 |
| 20.0 | 1600 | <20 | (friable) | 10.1 | (friable) |

It has been discovered that the tetragonal $ZrO_2$ phase can be retained at much higher $ZrO_2$ contents by adding a controlled amount of $Y_2O_3$ to the composite. Samples were prepared and evaluated as previously described for $Al_2O_3/ZrO_2$ composites (Table I) except that $$2\ m/o\ Y_2O_3 \left( m/o = \frac{\text{moles } Y_2O_3 \times 100}{\text{moles } Y_2O_3 + \text{moles } ZrO_2} \right)$$

was added to the powders. The $Y_2O_3$ was introduced as yttrium nitrate (from Research Chemicals Inc.) and the mixture of dried powders was calcined at 400° C. for 4 hours prior to hot pressing.

Examples according to the invention are shown in Table II. When 2 m/o $Y_2O_3$ was included in the $Al_2O_3/ZrO_2$ composite, the $ZrO_2$ was 100% tetragonal for compositions up to about 45 v/o $ZrO_2$. Approximately 80% of the $ZrO_2$ was tetragonal even at 100 v/o $ZrO_2$. Thus, the $Y_2O_3$ addition greatly increased the amount of tetragonal $ZrO_2$ which could be retained in the $Al_2O_3/ZrO_2$ composite as can be seen by comparing samples made under similar conditions with and without the $Y_2O_3$ (Tables II and I). With 2 m/o $Y_2O_3$, up to 80 v/o of the entire sample could be tetragonal $ZrO_2$ (for the 100 v/o $ZrO_2$ sample); without the $Y_2O_3$ the maximum amount of tetragonal $ZrO_2$ which could be retained in the sample was only about 9% (for the 12.5 v/o $ZrO_2$ sample).

TABLE II

Phase Content and Properties of $Al_2O_3/ZrO_2$ Composites Containing 2 $^m/_o$ $Y_2O_3$

| $ZrO_2$ v/o | Pressing Temp, °C. | Tetragonal $ZrO_2$ Phase % | Density gm/cm$^3$ | Vickers Hardness GPa | Stress Intensity Factor, K MPam$^{\frac{1}{2}}$ | Modulus E GPa | Flexure Strength MPa |
|---|---|---|---|---|---|---|---|
| 6.0 | 1600 | 100 | 4.12 | 16.8 | 5.97 | — | 760 |
| 12.3 | 1600 | 100 | 4.26 | 15.9 | 6.22 | — | 750 |
| 18.2 | 1600 | 100 | 4.38 | 16.1 | 6.58 | 356 | 1090 |
| 23.9 | 1600 | 100 | 4.50 | 16.4 | 6.38 | — | 860 |
| 29.5 | 1600 | 100 | 4.62 | 15.7 | 7.43 | — | 1150 |
| 45.0 | 1600 | trace monoclinic | 4.89 | 15.1 | 8.12 | 291 | — |
| 60.0 | 1600 | ~95 | 5.24 | 13.7 | 7.45 | — | — |
| 80.0 | 1400 | ~85 | 5.57 | 12.6 | 6.79 | 237 | — |
| 100.0 | 1400 | ~80 | 6.01 | 11.6 | 6.62 | 210 | — |

$ZrO_2$ can also exist in a cubic structure. The $ZrO_2$-$Y_2O_3$ phase diagram (K. K. Srivastaba, et al, Trans. Brit. Ceram. Soc. 73, 85, 1974) shows that cubic $ZrO_2$ is stable when the m/o of $Y_2O_3$ is over about 7 m/o $Y_2O_3$. Samples were fabricated as described above except 7.5 m/o $Y_2O_3$ was included in the composite. The results obtained from these samples is shown in Table III. In all the samples $ZrO_2$ existed in the cubic structure rather than the desired tetragonal structure or the monoclinic structure obtained in the samples shown in Tables I and II. These results, and conclusions drawn from studying the $ZrO_2$-$Y_2O_3$ phase diagram indicate that the maximum amount of $Y_2O_3$ which can be used to retain the desired tetragonal structure is about 5.5 m/o. The optimum amount of $Y_2O_3$ for strengthening the composite is approximately 2 m/o.

TABLE III

Phase Content and Properties of $Al_2O_3/ZrO_2$ Composites Containing 7.5$^m/_o$$Y_2O_3$

| $ZrO_2$ v/o | Pressing Temp, °C. | Cubic $ZrO_2$ Phase % | Density g/cm$^3$ | Vickers Hardness GPa | Stress Intensity Factor, $K_c$ MPam$^{\frac{1}{2}}$ |
|---|---|---|---|---|---|
| 20.0 | 1600 | 100 | 4.46 | 15.8 | 4.54 |
| 40.0 | 1600 | 100 | 4.89 | 15.9 | 3.75 |
| 60.0 | 1600 | 100 | 5.28 | 15.0 | 3.50 |

TABLE III-continued

Phase Content and Properties of
Al₂O₃/ZrO₂ Composites Containing 7.5 m/o Y₂O₃

| ZrO₂ v/o | Pressing Temp, °C. | Cubic ZrO₂ Phase % | Density g/cm³ | Vickers Hardness GPa | Stress Intensity Factor, $K_c$ MPam$^{\frac{1}{2}}$ |
|---|---|---|---|---|---|
| 80.0 | 1600 | 100 | 5.63 | 14.3 | 3.14 |
| 100.0 | 1600 | 100 | 5.95 | 11.4 | 3.90 |

All the samples (except the end members of pure Al₂O₃ and ZrO₂) had a microstructure consisting of two phases, the Al₂O₃ phase and the ZrO₂ phase. In general, the minor phase was uniformly dispersed, although there was some agglomeration of the minor phase in occasional groups of 2 to 5 grains. The average grain size for the composite materials was dependent on the fabrication temperature; namely about 0.2 μm at 1400° C., 0.5 μm at 1500° C., and 1 μm at 1600° C. The average grain size of the end member compositions which were hot-pressed at 1400° C. was about 2 μm for the Al₂O₃ and about 0.5 μm for the ZrO₂.

Theoretical calculations by the present inventor (F. F. Lange, "Stress-Induced Phase Transformation: Theory of Phase Retention and Fracture Toughness", Office of Naval Research Report #6, Contract N00014-77-C-0441, October, 1979) indicate that a critical size exists, below which a particle of tetragonal ZrO₂ can be constrained from transforming by an elastic matrix. The critical particle (or grain) size can be increased by increasing the elastic properties of the constraining matrix. It has been estimated that a particle size less than about 0.2 μm would be required to retain pure, tetragonal ZrO₂ in a ZrO₂ constraining matrix (E=about 210 GPa). However, pure, tetragonal ZrO₂ can be retained for an average particle size of 0.5 μm when the elastic modulus of the constraining material is increased to that of Al₂O₃ (E=about 390 GPa) by incorporating a large volume % of Al₂O₃ in an Al₂O₃/ZrO₂ matrix. Less tetragonal ZrO₂ is retained in the Al₂O₃/ZrO₂ composite as the volume % of Al₂O₃ is decreased because the elastic modulus of the composite decreases and shifts the critical particle size to smaller values than those achieved during fabrication.

According to this invention, Y₂O₃ is included in an Al₂O₃/ZrO₂ composite. The Y₂O₃ is held in solid solution in the ZrO₂ and it increases the critical grain size below which tetragonal ZrO₂ can be retained in an Al₂O₃/ZrO₂ matrix. Consequently, tetragonal ZrO₂ can be obtained in Al₂O₃/ZrO₂ composites with grain sizes up to about 2 μm. The actual amount of ZrO₂ retained in the composite depends on the size of the grains in the composite and on the amount of Al₂O₃; small grain size and large v/o of Al₂O₃ favoring increased retention of tetragonal ZrO₂.

Al₂O₃/ZrO₂ ceramics produced according to this invention have improved fracture toughness as measured by the stress intensity factor ($K_c$). $K_c$ was measured on polished specimens by using the indentation technique and the function $$K_c = \frac{H\sqrt{d}}{3(H/3E)^{.4}} f(c/d)$$

developed by Evans and Charles (J. Am. Ceram. Soc. vol. 59, pp. 371-372, 1976). The hardness (H) was measured at a load of 20 Kgm. The half-diagonal (d) of the pyramidal indent and half-crack length (c) were used with Young's modulus and the experimentally obtained function (f(c/d)) to compute $K_c$. As shown in Tables I and II, $K_c$ is substantially higher in the 2 m/o Y₂O₃ containing Al₂O₃/ZrO₂ ceramics (Table II) than in pure Al₂O₃ or the non-yttrium containing Al₂O₃/ZrO₂ ceramics (Table I).

The flexure strength of the 2 m/o composites was measured using four-point bending tests (inner span of 1.22 cm, outer span of 2.54 cm) on diamond cut specimens (0.32×0.32 cm cross section) finished with a 220 grit diamond grinding wheel. The high values shown for samples containing 18.2 and 29.5 v/o are attributed to compressive stresses caused by surface grinding which induces transformation of the tetragonal ZrO₂ to the monoclinic ZrO₂. When the 29.5 v/o sample was annealed at 1300° C. to eliminate the transformed surface layer, its strength was reduced to 920 MPa. Even for the annealed samples, the flexure strength of the Al₂O₃/ZrO₂+2 m/o Y₂O₃ composites was higher than for pure Al₂O₃ (580 MPa).

Young's modulus was measured at room temperature by the resonance technique in two modes of vibration: flexural at 9 kHz and extensional at 60 kHz.

Density was measured on 5 cm diameter hot-pressed billets using Archimede's technique. Vickers hardness was measured using a 20 kgm load. Both these properties appeared to follow the linear rule of mixtures for the end members (Al₂O₃ and ZrO₂).

Yttrium (Y) belongs to a family of 16 rare earth metals. A comparison of the phase diagrams ("Phase Diagrams for Ceramists" compiled by the National Bureau of Standards and published by The American Ceramic Society) of ZrO₂-Y₂O₃ with ZrO₂-CeO₂, with ZrO₂-Er₂O₃, and with ZrO₂-La₂O₃ shows similar behavior in that these four metal oxides each tend to lower the temperature of the transformation of ZrO₂ from the tetragonal to the monoclinic structure. It is therefore concluded that the addition of CeO₂, Er₂O₃, or La₂O₃ to an Al₂O₃/ZrO₂ composite would also favor the retention of tetragonal ZrO₂ in a manner analogous to the Y₂O₃ addition. As in the case of Y₂O₃, the amount added must be sufficient to cause the retention of tetragonal ZrO₂ but not so much as to cause the formation of substantial amounts of cubic ZrO₂. According to the phase diagrams, CeO₂ is beneficial in the range of about 0.5 to 10 m/o, Er₂O₃ is beneficial in the range of 0.4 to 4 m/o, and La₂O₃ is beneficial in the range of about 0.5 to 5 m/o, $$(m/o) = \left( \frac{\text{moles of rare earth oxide}}{\text{moles of rare earth oxide + moles of ZrO}_2} \right).$$

Mixtures of Y₂O₃, CeO₂, Er₂O₃, and La₂O₃ could be added in various portions within the above ranges to promote the tetragonal ZrO₂.

The composition of the matrix can range from 5 to 95 v/o ZrO₂ (including the rare earth oxide dissolved therein) with the balance being essentially Al₂O₃. While the available test data shown the highest toughness and strength for compositions in the 30 to 45 v/o ZrO₂ range, there are other factors which may dictate a different composition. For example, ZrO₂ is a better insulator than Al₂O₃ and higher ZrO₂ compositions may be preferred for applications requiring high insulation. Al₂O₃ is lighter and harder than ZrO₂ and higher Al₂O₃ compositions may be preferred for applications requiring these properties.

The compositions according to the invention are useful in many applications, for example forming dies and tools, cutting tools, structural parts requiring electrical insulation, and many other applications in which a tough ceramic may be advantageous.

Numerous variations and modifications can be made without departing from the invention. For example, additives can be included in the composition to improve the fabricability or properties of the ceramic in accordance with recognized principles. Accordingly, it should be clearly understood that the form of the invention described above is illustrative only and is not intended to limit its scope.

What is claimed is:

1. A ceramic comprising:
   5 to 95 v/o $ZrO_2$ in the form of crystalline grains having a diameter less than about 2 μm and a substantially tetragonal structure;
   a rare earth oxide selected from the group consisting of $Y_2O_3$, $CeO_2$, $Er_2O_3$, and $La_2O_3$, there being at least enough of said rare earth oxide to increase the amount of $ZrO_2$ having a tetragonal crystal structure, but not enough of said rare earth oxide to form substantial amounts of said $ZrO_2$ having a cubic crystal structure; and
   the remainder of said ceramic being substantially $Al_2O_3$.

2. A ceramic comprising:
   5–95 v/o $ZrO_2$ in the form of grains having a diameter less than about 2 μm;
   about 2 m/o $Y_2O_3$; and
   95 to 5 v/o $Al_2O_3$, whereby said $ZrO_2$ grains are substantially tetragonal in structure and said ceramic is free of $ZrO_2$ grains having a cubic structure.

3. A ceramic comprising:
   5 to 95 v/o $ZrO_2$ in the form of grains having a diameter less than about 2 μm and a sbstantially tetragonal structure;
   0.5 to 5.5 m/o $Y_2O_3$; and
   95 to 5 v/o $Al_2O_3$.

4. A ceramic comprising:
   5 to 95 v/o $ZrO_2$ in the form of grains having a diameter less than about 2 μm and a substantially tetragonal structure;
   0.5 to 10 m/o $CeO_2$; and
   95 to 5 v/o $Al_2O_3$.

5. A ceramic comprising:
   5 to 95 v/o $ZrO_2$ in the form of grains having a diameter less than about 2 μm and a substantially tetragonal structure;
   0.4 to 4 m/o $Er_2O_3$; and
   95 to 5 v/o $Al_2O_3$.

6. A ceramic comprising:
   30 to 60 v/o $ZrO_2$ in the form of grains having a diameter less than about 2 μm and a substantially tetrogonal structure;
   about 2 m/o $Y_2O_3$; and
   the remainder of said ceramic being substantially $Al_2O_3$.

7. A two phase ceramic composite comprising:
   a first phase occupying 5 to 95% of the volume of said ceramic composite, said first phase comprising $ZrO_2$ grains having a diameter less than about 2 μm with a rare earth oxide dissolved therein, at least 80% of said $ZrO_2$ having a tetragonal structure, said rare earth oxide being selected from the group consisting of $Y_2O_2$, $CeO_2$, and $Er_2O_3$; and
   a second phase comprising $Al_2O_3$ and occupying substantially all remaining volume of said ceramic composite.

8. The ceramic composite as claimed in claim 7 wherein said rare earth oxide comprises $Y_2O_3$.

9. A ceramic comprising:
   5 to 95 v/o $ZrO_2$ in the form of grains having a diameter less than about 2 μm and a substantially tetragonal structure;
   0.5 to 5 m/o $La_2O_3$; and
   95 to 5 v/o $Al_2O_3$.

* * * * *